(12) United States Patent
Williams et al.

(10) Patent No.: US 9,441,677 B2
(45) Date of Patent: Sep. 13, 2016

(54) OVERRUNNING DECOUPLER

(75) Inventors: Warren Williams, Oakville (CA); John R. Antchak, Aurora (CA)

(73) Assignee: Litens Automotive Partnership, Woodbridge, ON (CA)

( * ) Notice: Subject to any disclaimer, the term of this patent is extended or adjusted under 35 U.S.C. 154(b) by 701 days.

(21) Appl. No.: 13/805,467

(22) PCT Filed: Jun. 17, 2011

(86) PCT No.: PCT/CA2011/000713
§ 371 (c)(1),
(2), (4) Date: Dec. 19, 2012

(87) PCT Pub. No.: WO2011/160202
PCT Pub. Date: Dec. 29, 2011

(65) Prior Publication Data
US 2013/0098727 A1    Apr. 25, 2013

Related U.S. Application Data

(60) Provisional application No. 61/358,582, filed on Jun. 25, 2010, provisional application No. 61/406,699, filed on Oct. 26, 2010.

(51) Int. Cl.

| | |
|---|---|
| F16D 7/02 | (2006.01) |
| F16D 13/76 | (2006.01) |
| F16D 41/20 | (2006.01) |
| F16F 15/123 | (2006.01) |
| F16H 55/36 | (2006.01) |
| B60K 25/02 | (2006.01) |
| F02B 67/06 | (2006.01) |

(52) U.S. Cl.
CPC ............... *F16D 7/022* (2013.01); *F16D 13/76* (2013.01); *F16D 41/206* (2013.01); *F16F 15/123* (2013.01); *F16H 55/36* (2013.01); *B60K 2025/022* (2013.01); *F02B 67/06* (2013.01)

(58) Field of Classification Search
CPC ...... F16D 7/022; F16D 13/76; F16D 41/206; F16H 55/36; B60K 2025/022
See application file for complete search history.

(56) References Cited

U.S. PATENT DOCUMENTS

| | | |
|---|---|---|
| 773,320 A | 10/1904 | Haase |
| 2,396,985 A | 3/1946 | Burrus |
| 2,486,149 A | 10/1949 | Gorske et al. |

(Continued)

FOREIGN PATENT DOCUMENTS

| | | |
|---|---|---|
| CN | 101395398 A | 3/2009 |
| WO | WO-2010048732 A1 | 5/2010 |

OTHER PUBLICATIONS

International Search Report and Written Opinion for PCT/CA2011/000713, mailed Aug. 25, 2011; ISA/CA.

(Continued)

*Primary Examiner* — Huan Le
(74) *Attorney, Agent, or Firm* — Millman IP Inc.

(57) ABSTRACT

A decoupler having an input member, an output member and a combination one-way clutch and torsional isolator that couples the input and output members. The combination one-way clutch and torsional isolator includes a single helical coil spring. The decoupler being designed to provide torsional damping through a range of torque transmitted through the decoupler, the range including a maximum rated torque for the decoupler.

21 Claims, 4 Drawing Sheets

(56) References Cited

U.S. PATENT DOCUMENTS

| | | |
|---|---|---|
| 2,551,739 A | 5/1951 | Harlan |
| 2,633,953 A | 4/1953 | Gorske |
| 2,794,524 A | 6/1957 | Sacchini |
| 2,829,748 A | 4/1958 | Sacchini et al. |
| 2,866,349 A | 12/1958 | Heckenthorn |
| 2,885,896 A | 5/1959 | Hungerford, Jr. et al. |
| 2,968,380 A | 1/1961 | Sacchini |
| RE25,229 E | 8/1962 | Sacchini |
| 3,059,493 A | 10/1962 | Wolfram |
| 3,242,696 A | 3/1966 | Kaplan |
| 3,298,486 A | 1/1967 | Perryman |
| 3,618,730 A | 11/1971 | Mould, III |
| 4,460,076 A | 7/1984 | Yamada |
| 5,139,463 A | 8/1992 | Bytzek et al. |
| 5,156,573 A | 10/1992 | Bytzek et al. |
| 5,437,205 A | 8/1995 | Tseng |
| 5,598,913 A | 2/1997 | Monahan et al. |
| 5,722,909 A | 3/1998 | Thomey |
| 5,879,254 A | 3/1999 | Tanaka |
| 6,394,247 B1 * | 5/2002 | Monahan et al. ......... 192/41 S |
| 6,394,248 B1 | 5/2002 | Monahan et al. |
| 6,676,548 B2 | 1/2004 | Fujiwara |
| 6,761,656 B2 | 7/2004 | King et al. |
| 7,052,420 B2 | 5/2006 | King et al. |
| 7,070,033 B2 | 7/2006 | Jansen et al. |
| 7,153,227 B2 | 12/2006 | Dell et al. |
| 7,207,910 B2 | 4/2007 | Dell et al. |
| 7,591,357 B2 | 9/2009 | Antchak et al. |
| 7,618,337 B2 | 11/2009 | Jansen et al. |
| 7,624,852 B2 | 12/2009 | Mevissen et al. |
| 7,712,592 B2 | 5/2010 | Jansen et al. |
| 2002/0104730 A1 | 8/2002 | Terada |
| 2004/0014540 A1 | 1/2004 | Dell et al. |
| 2008/0194339 A1 | 8/2008 | Antchak et al. |
| 2009/0176583 A1 | 7/2009 | Dell et al. |

OTHER PUBLICATIONS

Second Office Action for CN201180030973, May 11, 2015 (SIPO).

* cited by examiner

OVERRUNNING DECOUPLER

CROSS-REFERENCE TO RELATED APPLICATIONS

This application is a 371 U.S. National Stage of International Application No. PCT/CA2011/000713, filed on Jun. 17, 2011, which claims priority to U.S. Provisional Application No. 61/358,582, filed on Jun. 25, 2010 and U.S. Provisional Application No. 61/406,699, filed on Oct. 26, 2010. The contents of the above applications are incorporated herein by reference in their entirety.

The present disclosure generally relates to drive systems in which rotary power is transmitted between a source of rotary power and one or more driven components and an over-running decoupler is employed to dampen fluctuations in the torsional load transmitted from the source of rotary power to the driven component, as well as to permit one or more of the driven components to be decoupled from and re-coupled to the source of rotary power to reduce or eliminate torsional loads occurring as a result of acceleration or deceleration of the source of rotary power relative to the driven component. More particularly, the present disclosure relate to a method for inhibiting a resonant condition in an over-running decoupler.

It is known to provide an over-running decoupler in a drive system to permit one or more driven components in the drive system to decouple to reduce or eliminate torsional loads occurring as a result of the acceleration or deceleration of a source of rotary power relative to the driven component. Exemplary over-running decouplers are disclosed in U.S. patent application Ser. Nos. 10/519,591, 10/542,625, 10/572,128 and 10/581,097 and employ a torsionally resilient coupling between a decoupler input member and a decoupler output member. While such devices are suited for their intended purpose, there remains a need in the art for an improved decoupler.

SUMMARY

This section provides a general summary of the disclosure, and is not a comprehensive disclosure of its full scope or all of its features.

In one form, the present teachings provide a decoupler that includes a first drive member, a second drive member and a one-way clutch and torsional damper. The first drive member is configured to be coupled to a shaft and includes a first drive surface that extends circumferentially about and axially along a rotational axis of the decoupler. The second drive member has a power transmitting portion and a second drive surface. The power transmitting portion is configured to receive a rotary input to the decoupler or to transmit a rotary output from the decoupler. The second drive surface is coupled to the power transmitting portion for common rotation about the rotational axis of the decoupler. The second drive surface extends circumferentially about and axially along the rotational axis of the decoupler. The one-way clutch and torsional damper is formed by a single helical coil spring that is disposed coaxially about the rotational axis of the decoupler between the first drive member and the second drive member.

In another form, the present teachings provide a decoupler having an input member, an output member and a combination one-way clutch and torsional isolator that couples the input and output members. The combination one-way clutch and torsional isolator includes a single helical coil spring.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Figure 1:
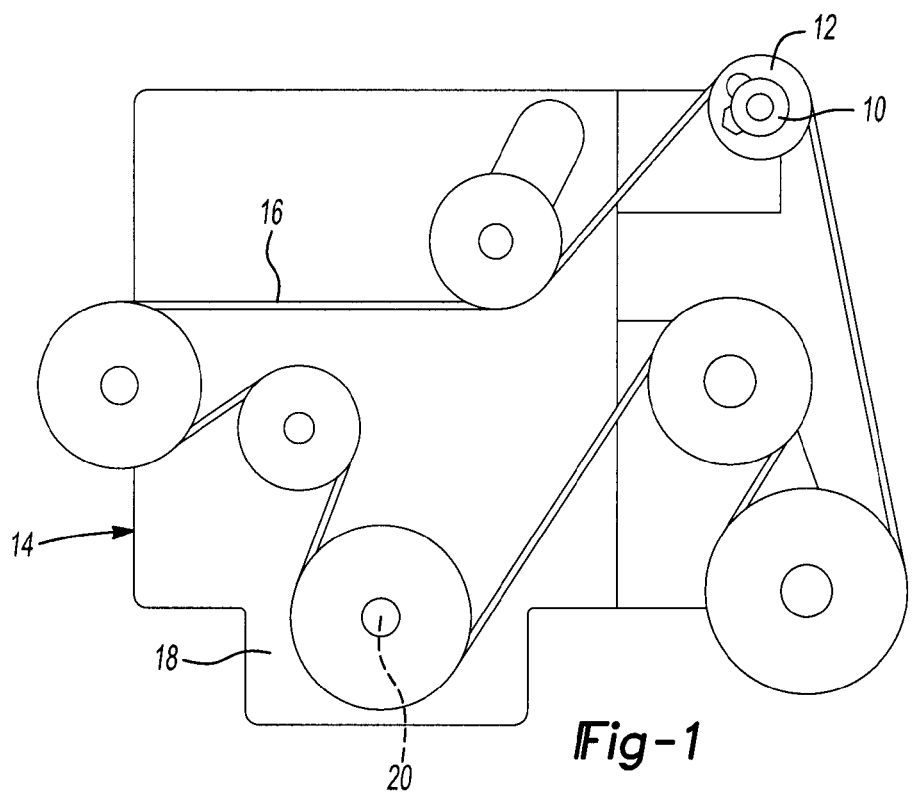
FIG. 1 is a schematic illustration of an exemplary engine and front accessory drive system that incorporates a decoupler constructed in accordance with the teachings of the present disclosure, the decoupler being disposed between an endless power transmitting element and an input of a driven device.
Figure 2:
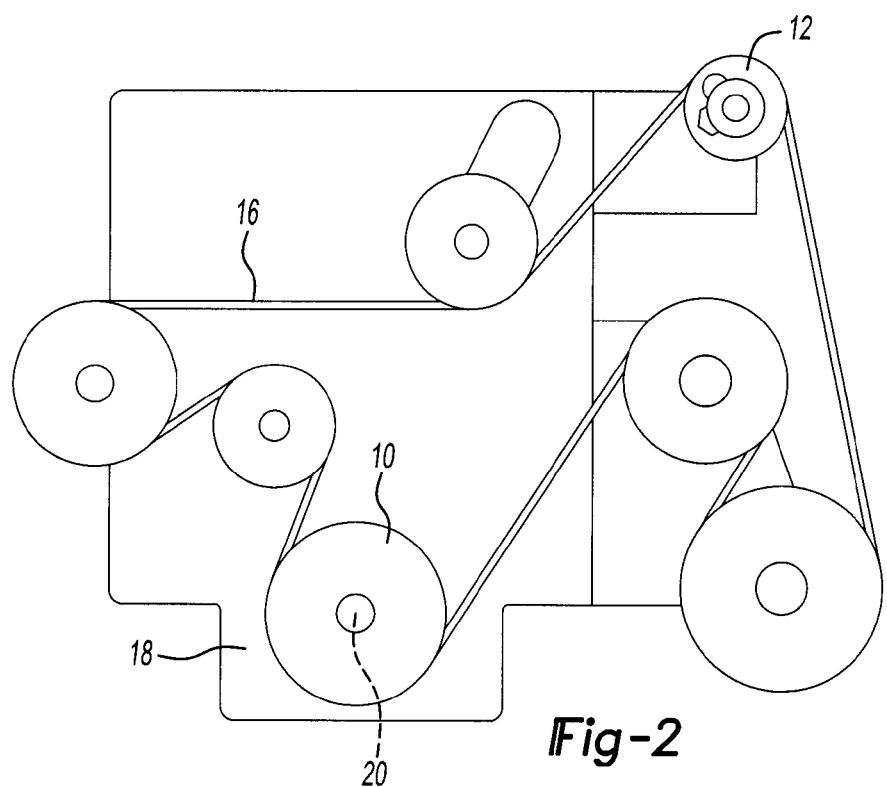
FIG. 2 is a schematic illustration of an exemplary engine and front accessory drive that incorporates a decoupler constructed in accordance with the teachings of the present disclosure, the decoupler being disposed between an output of the engine and an endless power transmitting element.

With reference to FIG. 1 of the drawings, an over-running decoupler constructed in accordance with the teachings of the present disclosure is generally indicated by reference numeral 10. The particular over-running decoupler 10 illustrated is particularly suited for use with a driven device 12, such as an alternator or a supercharger, in a drive system 14 that employs an endless power transmitting element 16, such as a belt or a chain, from a source of rotary power 18, such as an engine or a transmission. Those of skill in the art will appreciate that the over-running decoupler 10 could be configured for use in another type of drive system (e.g., a drive system employing gears) and/or that the over-running decoupler 10 could be employed to transmit rotary power from a drive shaft 20 into the drive system as shown in FIG. 2. Accordingly, it will be appreciated that the teachings of the present disclosure have application in a crankshaft decoupler, similar to those which are disclosed in U.S. patent application Ser. Nos. 10/572,128 and 10/542,625, the disclosures of which are hereby incorporated by reference as if fully set forth in detail herein.

Figure 3:
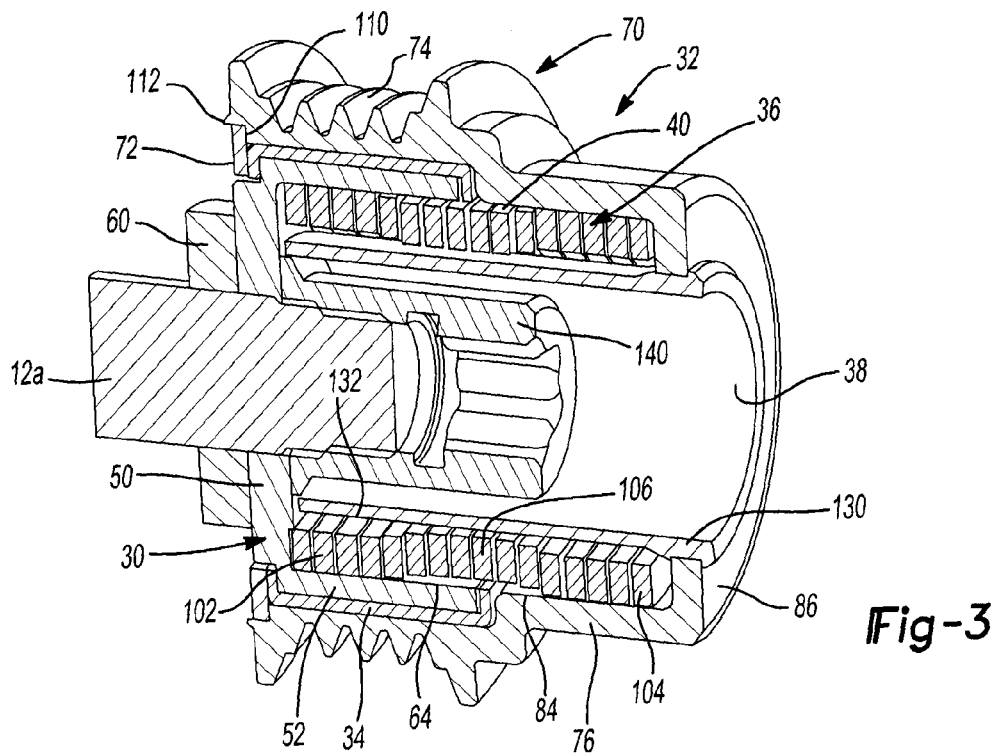
FIG. 3 is a longitudinal cross-section view of the decoupler that is schematically depicted in FIG. 1.
Figure 4:
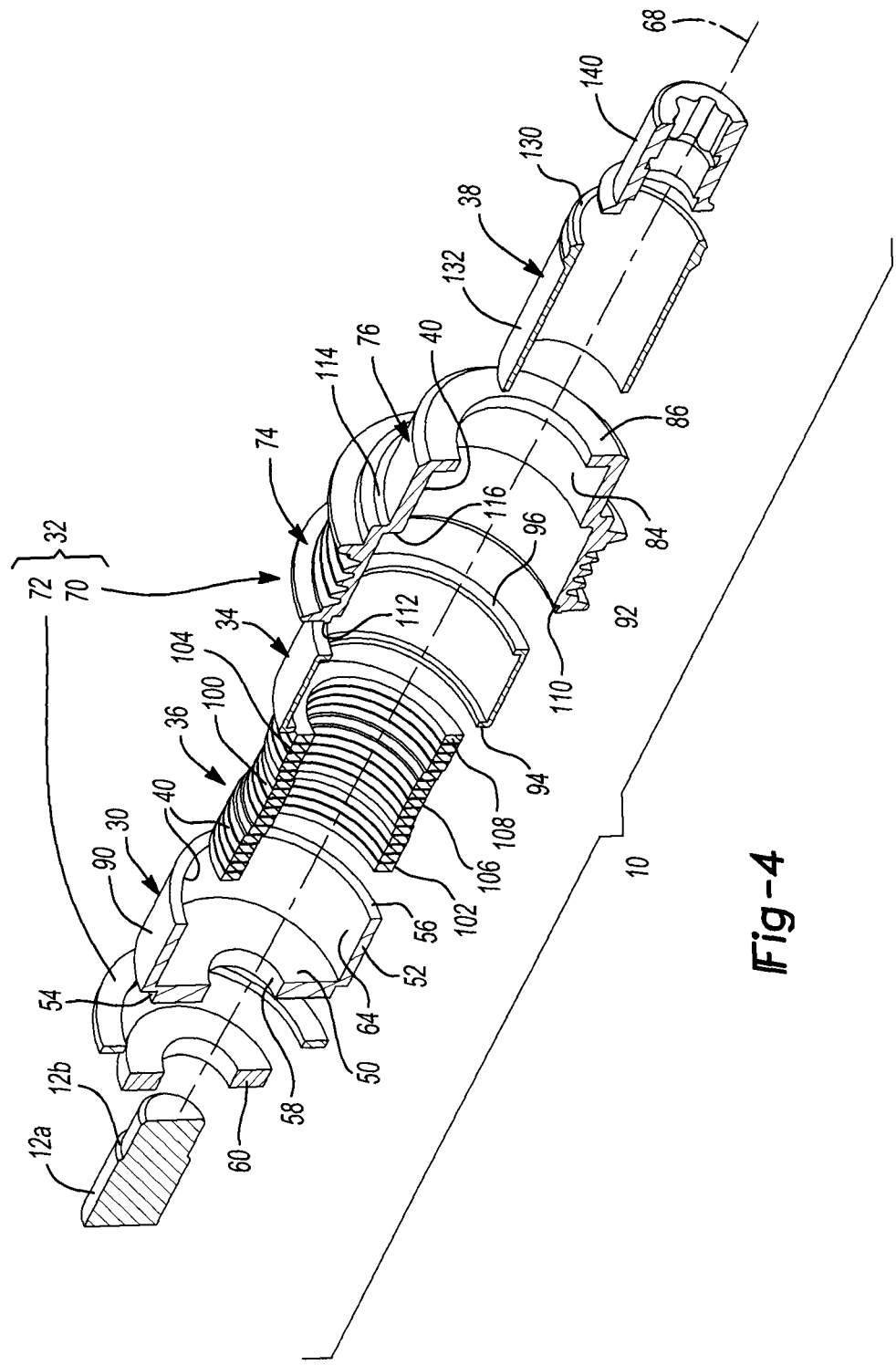
FIG. 4 is an exploded perspective longitudinal cross-section view of the decoupler that is schematically depicted in FIG. 1.

With reference to FIGS. 3 and 4, the decoupler 10 can include a first drive member 30, a second drive member 32, a bearing element 34, a one-way clutch and torsional damper 36, a tubular shield 38 and a lubricant 40.

Figure 5:
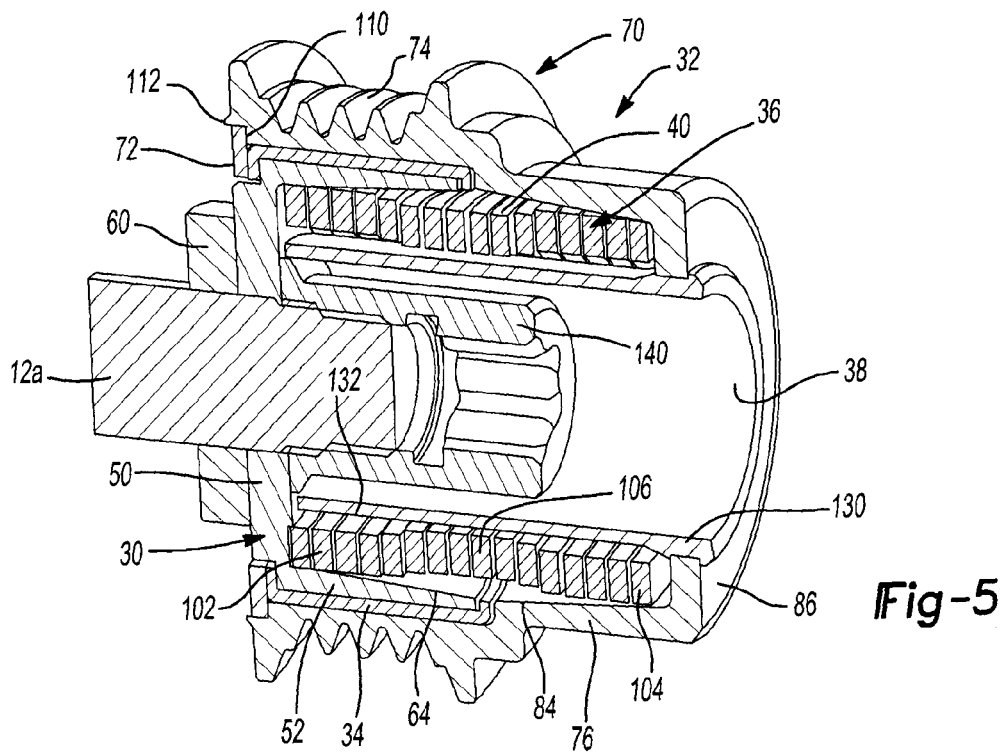
FIG. 5 is a view similar to that of FIG. 3 but depicting the decoupler as employing first and second drive surfaces that are tapered.

The first drive member 30 can be configured to be coupled for rotation with the shaft 12a of the driven device 12 (FIG. 1). In the particular example provided, the first drive member 30 is generally cup-shaped, having an annular end wall 50, a circumferentially extending side wall 52, and first and second shoulders 54 and 56. The annular end wall 50 can have a shaft aperture 58 formed therethrough for receipt of the shaft 12a. The annular end wall 50 can be abutted against a shoulder 12b formed on the shaft 12a and if desired, a spacer washer 60 can be disposed between the shoulder 12b and the annular end wall 50. The circumferentially extending side wall 52 can be a generally tubular structure that can extend axially away from the annular end wall 50. The circumferentially extending side wall 52 can define a first drive surface 64 that can extend circumferentially about and axially along a rotational axis 68 of the decoupler 10. In the particular example provided, the first drive surface 64 is defined by a constant radius over its entire length (i.e., the first drive surface 64 is shaped as the outer cylindrical surface of a right cylinder) but it will be appreciated that the first drive surface 64 could be configured differently (e.g., tapered over all or a portion of its length to converge toward the rotational axis 68 with decreasing distance from the annular end wall 50 as shown in FIG. 5). The first and second shoulders 54 and 56 can be axially spaced apart from one another in any convenient location. In the particular example provided, the first shoulder 54 is defined by a recess formed in the circumferentially extending side wall 52 and the annular end wall 50, while the second shoulder 56 is defined by the distal end of the circumferentially extending side wall 52. It will be appreciated, however, that a single shoulder may be employed in lieu of the two shoulders depicted in the particular example provided, and/or that one or more specially formed recesses need not be employed.

The second drive member 32 can include a drive structure 70 and a retainer 72 that will be discussed in more detail below. The drive structure 70 can include a power transmitting portion 74 and cup-shaped structure 76 that can define a second drive surface 84 and an annular end member 86. The power transmitting portion 74 can be configured to receive a rotary input to the decoupler 10 or to transmit a rotary output from the decoupler 10, depending on how the decoupler 10 is being used. In the particular example provided, the power transmitting portion 74 is configured to engage the endless power transmitting element 16 (FIG. 1) to input rotary power from the endless power transmitting element 16 (FIG. 1) to the decoupler 10. The power transmitting portion 74 can axially overlap all or a portion of the first drive member 30. The cup-shaped structure 76 can be fixedly coupled to the power transmitting portion 74 such that the second drive surface 84 is disposed between the power transmitting portion 74 and the annular end member 86. The second drive surface 84 can be defined by the interior circumferential surface of the cup-shaped structure 76 and in the particular example provided, the second drive surface 84 is defined by a constant radius over its entire length (i.e., the second drive surface 84 is shaped as the outer cylindrical surface of a right cylinder). It will be appreciated, however, that the second drive surface 84 could be configured differently (e.g., tapered over all or a portion of its length to converge toward the rotational axis 68 with decreasing distance from the annular end wall 50 as shown in FIG. 5). The annular end member 86 can extend radially inwardly toward the rotational axis 68.

The bearing element 34 can be disposed radially between the first and second drive members 30 and 32 to permit relative rotation between the first and second drive members 30 and 32. In the particular example provided, the bearing element 34 is a bushing that is fitted to the outer circumferential surface 90 of the first drive member 30 and the inner circumferential surface 92 of the power transmitting portion 74 and which has shoulders 94 and 96 that abut the first and second shoulders 54 and 56, respectively, to maintain the bearing element 34 in a desired axial orientation relative to the first drive member 30. While the bearing element 34 has been illustrated and describe herein as being a bushing, it will be appreciated that other types of bearing elements, including ball and roller bearings, could be employed in addition to or in lieu of the bushing.

The one-way clutch and torsional damper 36 can comprise a single helical coil spring 100 that can have a first end portion 102, a second end portion 104 and an intermediate portion 106 that can be disposed between the first and second end portions 102 and 104. The single helical coil spring 100 can comprise a plurality of coils 108 that can be formed of an appropriately shaped wire, such as a wire with a generally square or rectangular cross-sectional shape that has a flat or somewhat convex outer surface. The single helical coil spring 100 can be bounded axially between the annular end wall 50 and the annular end member 86.

The coils 108 of the first end portion 102 can be drivingly engaged to the first drive surface 64 and the coils 108 of the second end portion 104 can be drivingly engaged to the second drive surface 84. In the particular example provided, the coils 108 of the first and second end portions 102 and 104 are engaged in an interference fit to the first and second drive surfaces 64 and 84, respectfully. The coils 108 of the intermediate portion 106 can be normally disengaged from the first and second drive surfaces 64 and 84 (i.e., when no load is transmitted through the decoupler 10) and can be configured to expand and contract in response to changes in a magnitude of the torque that is transmitted through the decoupler 10. In this regard, at least a portion of the coils 108 of the intermediate portion 106 are configured to remain out of contact with the first drive surface 64 and the second drive surface 84 when the magnitude of the torque that is transmitted through the decoupler 10 is less than a predetermined maximum value.

The retainer 72 can be configured to retain the second drive member 32 to the first drive member 30 and to limit movement of the second drive member 32 away from the first drive member 30. The retainer 72 can be a discrete, washer-like component that can be fitted about the annular end wall 50, abutted against an associated one of the shoulders 94 on the bearing element 34, and fixedly coupled to the power transmitting portion 74. In the particular example provided, the power transmitting portion 74 includes a groove 110 into which the retainer 72 is received and a lip 112 formed on the power transmitting portion 74 can be swaged over the retainer 72 to inhibit movement of the retainer 72 in a direction axially outwardly from the groove 110. A transition zone 114 between the power transmitting portion 74 and the cup-shaped structure 76 can present an annular surface 116 that can abut an opposite one of the shoulders 96 on the bearing element 34, but it will be appreciated that an internal rib or snap ring could be employed in the alternative to limit movement of the second drive member 32 toward the first drive member 30.

The tubular shield 38 can be received into the first and second drive members 30 and 32 and the single helical coil spring 100. The tubular shield 38 can be formed of a suitable material, such as a metal or plastic, and can be supported by the shaft 12a, the first drive member 30, and/or the second drive member 70 as desired. In the particular example provided, the tubular shield 38 comprises a coupling neck 130, which is configured to engage the annular end member 86 in a snap-fit manner, and a tubular body 132 that can extend from the coupling neck 130 into the cavity in which the single helical coil spring 100 is housed. An end of the tubular body 132 opposite the coupling neck 130 can engage (e.g., in a slip-fit or press-fit manner) a shaft retention nut 140 that can be threadably engaged to the shaft 12a to fixedly couple the first drive member 30 to the (FIG. 1). It will be appreciated that the coupling neck 130 could be coupled to the annular end member 86 in other ways, including a press-fit connection or threads.

The lubricant 40 can be any type of lubricating material, such as appropriate grease, paste or "dry" lubricant material. It will be appreciated that other types of lubricants could be employed, such as an oil (e.g., conventional oil, synthetic oil, traction fluid) and that seals may be necessary or desirable in such situations. Additionally or alternatively, the wire that forms the single helical coil spring 100 could be coated with a wear resistant and/or lubricating material.

The single helical coil spring 100 can be wound so as to uncoil or expand radially when rotary power is input to the decoupler 10. In the particular example provided, frictional contact between the second end portion 104 of the single helical coil spring 100 and the second drive surface 84 applies a torque to the single helical coil spring 100 that causes the single helical coil spring 100 to uncoil, which can drivingly engage the first and second end portions 102 and 104 of the single helical coil spring 100 to the first and second drive surfaces 64 and 84, respectively. As noted above, the amount by which the intermediate portion 106 of the single helical coil spring 100 uncoils is dependent upon the magnitude of the torque that is transmitted through the decoupler 10 but at least a portion of the coils 108 of the intermediate portion 106 remain disengaged from the first drive surface 64, the second drive surface 84 or both the first and second drive surfaces 64 and 84 when a predetermined maximum torque is transmitted through the decoupler 10 so as to permit the single helical coil spring 100 to dampen torsional vibration that would otherwise be transmitted through the decoupler 10. Stated another way, the intermediate portion 106 of the single helical coil spring 100 provides torsional damping through a range of torque that is transmitted through the decoupler 10 and this range of torque includes a maximum rated torque capacity of the decoupler. It will be appreciated that the torque carrying capacity of the decoupler 10 increases as the amount of torque that is transmitted through the decoupler 10 increases due to the uncoiling of the intermediate portion 106 of the helical coil spring 100 which permits coils 108 to contact the first and second drive surfaces 64 and 84. The uncoiling of the intermediate portion 106 of the helical coil spring 100 is also associated with an increase in the spring rate of the helical coil spring 100.

The single helical coil spring 100 is also configured to operate with the first and second drive surfaces 64 and 84 as a one-way clutch that permits the first drive member 30 to overrun the second drive member 32. In the particular example provided, frictional contact between the first end portion 102 of the single helical coil spring 100 and the first drive surface 64 when the rotary acceleration of the first drive member 30 is greater than that of the second drive member 32 applies a torque to the single helical coil spring 100 that causes the single helical coil spring 100 to coil more tightly. If the coiling of the single helical coil spring 100 is sufficiently large, the first end portion 102 of the single helical coil spring 100 can disengage the first drive surface 64 to an extent that permits rotation of the first drive member 30 relative to the first end portion 102 of the single helical coil spring 100 to thereby permit the first drive member 30 to overrun the second drive member 32.

It will be appreciated that since at least a portion of the intermediate portion 106 of the single helical coil spring 100 does not engage either the first drive surface 64 or the second drive surface 84 during operation of the decoupler 10, the single helical coil spring 100 must be designed in whole or in part (i.e., a part that includes the intermediate portion 106) to not only carry a load that equals or exceeds a predetermined peak drive torque (i.e., the rated maximum torque capacity), but also to tune the natural frequency of the system that includes the driven device 12 (FIG. 1) in a manner that is below the firing frequency of an internal combustion engine used as the source of rotary power 18 (FIG. 1).

For example, a typical four cylinder, four-stroke internal combustion engine operating at an idle speed of 750 rpm will have a firing frequency of 25 Hz. By placing an appropriately configured spring element between the input of the decoupler 10 and the input of the driven device 12 (FIG. 1), the natural frequency of the system that includes the driven device 12 (FIG. 1) can be set to a point that is lower than the engine's firing frequency to thereby prevent resonance in the system (that might otherwise occur as a result of the idling of the engine. One method for setting the natural frequency of the system at a point below the engine's firing frequency involves the use of a safety factor. The safety factor could be a number between 0 and 1, for example 0.88 to 0.48, that could be multiplied by the engine firing frequency to provide a target natural frequency ($f_n$) for the system. It will be appreciated, however, that other techniques may be employed to create a margin of safety, such as subtracting a value, for example a predetermined constant, from the engine firing frequency to obtain the target natural frequency ($f_n$) for the system.

The target natural frequency ($f_n$) of the system can be employed to determine the spring rate (k) of the relevant portion of the single helical coil spring 100. One method for determining a spring rate employs the following formula:

$$k = (2\pi f_n)^2 J$$

where:
k=the torsional spring rate (Nm/rad) of the relevant portion of the single helical coil spring 100;
$f_n$=the target natural frequency (Hz); and
J=the inertia (kgm$^2$) of the driven device 12 (FIG. 1).

It will be apparent to those of skill in the art that the torsional spring rate of the relevant portion of the single helical coil spring 100 may be employed for the entirety of the single helical coil spring 100 and that the length of the intermediate portion 106 may be sized to appropriately to ensure that the intermediate portion 106 will remain torsionally resilient between the first drive member 30 and the second drive member 32.

Figure 6:
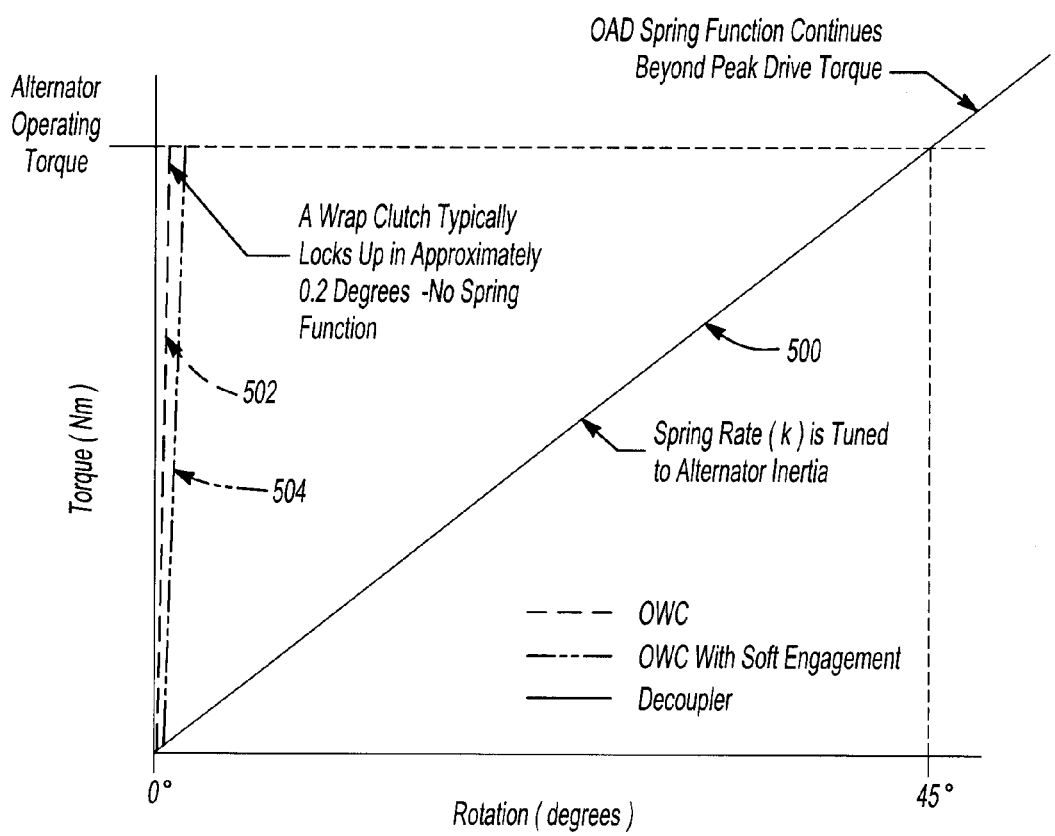
FIG. 6 is a plot illustrating the torsional loading of a one-way clutch, a one-way clutch with soft engagement and a decoupler as a function of the angle of rotation of a drive structure relative to a first drive member.

With reference to FIG. 6, several plots are depicted to contrast the operation of the decoupler 10 (FIG. 1) with the operation of two types of pulleys having only a one-way clutch (these other pulleys would replace the decoupler 10 as it is shown in FIG. 1). The plots depict the decoupler 10 (FIG. 1) and the two other pulleys when a predetermined load is applied to the driven device 12 (FIG. 1). More specifically, the plots illustrate the torsional loading of a one-way clutch, a one-way clutch with soft engagement and a decoupler as a function of the angle of rotation of the drive structure 70 (FIG. 3) relative to the first drive member 30 (FIG. 3).

With additional reference to FIGS. 1 and 3, the plot 500 depicts significant rotation of the first drive member 30 relative to the second drive member 32 during the operation of the decoupler 10 when the torque transmitted through the decoupler 10 is sufficient to drive the predetermined load on the driven device 12. In contrast, the plot 502 depicts a device constructed similar to the decoupler 10 but which employs a single helical coil spring that does not include an intermediate portion and is not tuned to the inertia of the driven device 12. In this situation, the single helical coil spring will typically lock in response to a very small angular displacement (e.g., 0.2 degrees) between the clutch input and output members. The plot 504 depicts another device that constructed similar to the device of the previous example, except that the single helical coil spring that does include an intermediate portion but is not tuned to the inertia of the driven device 12. In this situation, the single helical coil spring will typically lock in response to a small angular displacement between the clutch input and output members.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

LISTING OF ELEMENTS decoupler 10
driven device 12
shaft 12a
shoulder 12b
drive system 14
power transmitting element 16
rotary power 18
drive shaft 20
first drive member 30
second drive member 32
bearing element 34
one-way clutch and torsional damper 36
tubular shield 38
lubricant 40
annular end wall 50
radially extending side wall 52
first shoulder 54
second shoulder 56

-continued shaft aperture 58
spacer washer 60
first drive surface 64
rotational axis 68
drive structure 70
retainer 72
power transmitting portion 74
cup-shaped structure 76
second drive surface 84
annular end member 86
outer circumferential surface 90
inner circumferential surface 92
shoulder 94
shoulder 96
helical coil spring 100
first end portion 102
second end portion 104
intermediate portion 106
coils 108
groove 110
lip 112
transition zone 114
annular surface 116
coupling neck 130
tubular body 132
shaft retention nut 140
plot 500
plot 502
plot 504
idle speed 750

What is claimed is:

1. A decoupler comprising:
a first drive member that is adapted to be coupled to a shaft, the first drive member comprising a first drive surface that extends circumferentially about and axially along a rotational axis of the decoupler;
a second drive member having a power transmitting portion and a second drive surface, the power transmitting portion being configured to receive a rotary input to the decoupler or to transmit a rotary output from the decoupler, the second drive surface being coupled to the power transmitting portion for common rotation about the rotational axis of the decoupler, the second drive surface extending circumferentially about and axially along the rotational axis of the decoupler; and
a one-way clutch and torsional damper formed by a single helical coil spring disposed coaxially about the rotational axis of the decoupler between the first drive member and the second drive member, wherein the single helical coil spring is configured to provide torsional damping through a range of torque transmitted through the decoupler, the range of torque including a rated maximum torque capacity of the decoupler.

2. The decoupler of claim 1, wherein the single helical coil spring comprises a first end portion, which is abutted against the first drive surface, a second end portion, which is abutted against the second drive surface, and an intermediate portion between the first and second end portions, the intermediate portion comprising a plurality of coils that are configured to expand and contract in response to changes in a magnitude of a torque that is transmitted through the decoupler, at least a portion of the coils being configured to not contact the first and second drive surfaces when the magnitude of the torque is less than a predetermined maximum torque.

3. The decoupler of claim 1, wherein the first and second drive members comprise radially extending wall members that are disposed on opposite axial ends of the single helical coil spring.

4. The decoupler of claim 1, wherein the power transmitting portion is configured to engage an endless power transmitting element.

5. The decoupler of claim 1, wherein the first drive member is generally cup-shaped.

6. The decoupler of claim 1, wherein at least a portion of the first drive surface is tapered.

7. The decoupler of claim 1, wherein at least a portion of the second drive surface is tapered.

8. The decoupler of claim 7, wherein at least a portion of the first drive surface is tapered.

9. The decoupler of claim 1, wherein the power transmitting portion axially overlaps at least a portion of the first drive surface.

10. The decoupler of claim 9, wherein a bearing element is disposed radially between the power transmitting portion and the first drive member.

11. The decoupler of claim 10, wherein the bearing element is a bushing.

12. The decoupler of claim 11, wherein the first drive member has a pair of axially spaced apart shoulders that cooperate with shoulders formed on the bushing to inhibit axial movement of the bushing relative to the first drive member.

13. The decoupler of claim 12, wherein the second drive member comprises an abutting wall that abuts one of the shoulders of the bushing on a side opposite a corresponding one of the first drive member.

14. The decoupler of claim 13, wherein the second drive member further comprises a retainer coupled to the power transmitting portion, the retainer abutting the other one of the shoulders of the bushing on a side opposite an associated one of the shoulders on the first drive member.

15. The decoupler of claim 1, wherein a tubular shield is disposed radially inwardly of the single helical coil spring.

16. The decoupler of claim 15, further comprising a shaft retention nut that is adapted to be threadably engaged to the shaft, the shaft retention nut being received in the tubular shield and engaging a radially inner surface of the tubular shield.

17. The decoupler of claim 15, wherein the tubular shield is snap-fit to the second drive member.

18. The decoupler of claim 15, further comprising a lubricant disposed between the single helical coil spring and at least one of the first and second drive surfaces.

19. A decoupler having an input member, an output member and a combination one-way clutch and torsional isolator that couples the input and output members, the combination one-way clutch and torsional isolator comprising a single helical coil spring, wherein the torsional isolator is effective through a range of torque transmitted through the decoupler, the range of torque including a rated maximum torque capacity of the decoupler.

20. The decoupler of claim 19, wherein the torsional spring rate and torque capacity of decoupler increase as the amount of torque transmitted through the decoupler increases toward a predetermined maximum torque.

21. The decoupler of claim 20, wherein the single helical coil spring is physically constrained at the predetermined maximum torque to limit a peak stress in a wire that forms the single helical coil spring.

* * * * *